United States Patent Office 3,037,851
Patented June 5, 1962

3,037,851
STABILIZED LEADED GASOLINE
Harold J. Scheule, Salem, N.J., assignor to E. I. du Pont de Nemours and Company, Wilmington, Del., a corporation of Delaware
No Drawing. Filed June 28, 1956, Ser. No. 594,350
6 Claims. (Cl. 44—62)

This invention is directed to gasolines containing tetraethyllead and more particularly to a method for stabilizing said gasolines against becoming cloudy and depositing precipitates on storage and on exposure to light.

Many commercially available gasolines containing tetraethyllead develop a haze on storage, which increases with time, forming a definite precipitate containing high percentages of lead. Both the haze and the precipitate are objectionable. The former is associated by the customer with poor quality. Gasolines which are hazy tend to deposit the suspended material and hence clog screens and fine orifices through which they pass, even though the actual amount of solid may be very small. Larger amounts of precipitate form troublesome deposits in tanks and also in lines and other parts in which the gasoline may remain under some circumstances. Such deposits are particularly objectionable on the walls of sight glasses and similar exposed glass parts of gasoline pumps, in which light greatly accelerates the formation of deposits, which must be frequently removed. Another serious result of the precipitation is the reduction of the tetraethyllead content of the gasoline. The obvious ways of overcoming the formation of haze and the precipitation are in most cases ineffective, such as adding antioxidants with the hope of preventing the formation of the insoluble material (except that certain types are helpful) or adding conventional dispersing agents with the hope of keeping it suspended.

It is an object of the present invention to inhibit the formation of haze and precipitation in gasolines containing tetraethyllead by stabilizing said gasoline with an oil-soluble copolymer containing basic amino nitrogen.

More specifically, the present invention is directed to a leaded gasoline containing about 0.0003 to about 0.01% by weight of an oil-soluble copolymer containing in combined form as its essential monomeric components copolymerizable ethylenically unsaturated compounds each containing only one polymerizable ethylenically unsaturated linkage, at least one of which compounds is aminofree and contains from 8 to about 18 carbon atoms in an aliphatic hydrocarbon chain, which in the polymer is not part of the main chain, and one of the components, as it exists in the polymer, containing a basic amino nitrogen in the side chain, said copolymer containing 0.1 to 3.5% by weight of basic amino nitrogen having an inherent viscosity of 0.1 to 3.0 as determined at 0.1% weight/volume concentration in benzene at 25° C.

For purpose of brevity the copolymers of the present invention will be referred to as basic amino copolymers.

By "leaded gosoline" is meant a gasoline containing sufficient tetraethyllead to improve its antiknock rating substantially (usually 0.5 to 4.6 ml. per gal.); said gasoline may contain hydrocarbons of the aliphatic, naphthenic and aromatic series and may be either saturated or unsaturated and may be straight run or catalytically or thermally cracked, or may be made by a combination of simpler molecules.

The basic amino copolymers used in the present invention are conveniently made by heating the required monomers in solution in the presence of a free-radical catalyst, as is more fully discussed, together with other methods of preparation, in U.S. 2,737,496 and 2,737,452. The polymerizable monomeric components must include one which contains an aliphatic chain of at least eight carbon atoms and another which contains a basic amino nitrogen structure. In addition to these monomers which are essential, other monomers containing neither long chains nor basic nitrogen may be used. Examples of the first class are ethylenically unsaturated esters, ethers, amides, and hydrocarbons, containing the long chains, particularly the acrylates and methacrylates of long-chain aliphatic alcohols. Examples of the second class are ethylenically unsaturated esters and ethers of amino alcohols, amino substituted olefins such as dimethylaminoethyl styrene, unsaturated amines such as allyl amines, and basic nitrogen heterocycles containing ethylic unsaturation, such as the vinyl pyridines. Tertiary amino groups are usually preferred. Examples of the third class of monomers, containing neither long-chain nor basic nitrogens include such common polymerizables as styrene, acrylonitrile, and methacrylic anilide.

It has been found that the same basic copolymers disclosed in U.S. Patent 2,737,496 and U.S. Patent 2,737,452 as stabilizers for lubricating and fuel oils respectively, are surprisingly effective for leaded gasoline by preventing the formation of haze and precipitation according to the present invention, a distinctly different effect than that achieved in lubricating and fuel oils. Thus, in the case of oils, the troublesome effect is the formation of sludges and varnish-like deposits, both of which are organic in nature and are believed to result from the oxidatoin and decomposition of the oil. On the other hand, the troublesome effect overcome in the present invention comes from the formation of essentially inorganic solids containing high proportions (50 to 60%) of lead. The effects of the additives is little understood in any of these systems. It may be in part a suspending action. However, the knowledge of the effect of the basic copolymers upon oils containing sludge would not suggest their effect on leaded gasoline, which effect forms the basis of the present invention. Little is known about dispersing action in liquid hydrocarbon systems which is helpful in predicting what agents will be effective in a particular case. What little information is available on such systems emphasizes the highly specific nature of the dispersing agent. This is shown by the fact, which is fully brought out by experiments described in the above patents, that several different types of dispersing agents effective in hydrocarbon systems for other purposes are inferior for sludge and varnish control and may even increase the amount of sludge. See particularly Table VIII of 2,737,452.

The proportions used of the basic copolymers will depend upon the extent of the stabilization desired and the susceptibility of the particular gasoline to deposit formation. Furthermore, the particular basic copolymer selected will also depend in part upon the particular gasoline to be stabilized, since certain basic copolymers are exceptionally effective with certain gasolines. Mixtures of two types of basic copolymers are sometimes used to advantage. The basic copolymers may be used together with other gasoline additives, such as antioxidants, metal deactivators, and dyes, as well as antiknock agents and their scavengers. In general, the basic copolymers made from esters of acrylic and methacrylic acid with long chain alcohols and dialkylamino alcohols are preferred.

EXAMPLES

The stabilized gasolines in the following examples are made by adding tetraethyllead and the specified basic amino copolymer to three unleaded gasolines described below. The basic amino copolymers are added by stirring the viscous material directly into the gasoline or, more conveniently, by first dissolving the copolymer in a small amount of gasoline or other hydrocarbon solvent and then mixing this solution with the gasoline. Their concentration is expressed in percent and in pounds per 1000 barrels of gasoline. The tetraethyllead is added in the form of a commercial mixture with the scavenging agents, ethylene dichloride and dibromide.

Two accelerated tests were used to determine the stability of the gasoline. In one, the gasoline was exposed in clear glass bottles to direct sunlight and the number of hours of sunlight required to produce the first observable haze was determined. In the other test, the gasoline was stored in glass bottles at 110° F. in the dark and the number of days for the first observable haze was determined. The latter test is widely used in the industry. When a gasoline is stable for one month in this accelerated test, it may be assumed that it would be stable for about four months under ordinary storage conditions.

*Table I*

EFFECT OF SUNLIGHT—COMPARISON OF COPOLYMERS—EXPOSURE PRODUCING FIRST NOTICEABLE HAZE

|  | Control, hrs. | Copolymer | | | | |
|---|---|---|---|---|---|---|
|  |  | A | C | D | E | F |
|  |  | 10 lbs. per 1,000 bbl. 0.0038% | 8 lbs. per 1,000 bbl. 0.0031% | 20 lbs. per 1,000 bbl. 0.0076% | 20 lbs. per 1,000 bbl. 0.0076% | 20 lbs. per 1,000 bbl. 0.0076% |
| Fuel A +3 ml. TEL per gal | 3 | 31 | 22 | 24 | 20 | 21 |
| Fuel B +3 ml. TEL per gal | 3 | 48 | 22 | 20 | 21 | 20 |
| Fuel C +3 ml. TEL per gal | 3 | 48 |  |  |  |  |

Fuel A is a commercial unleaded gasoline.
Fuel B is a commercial blend of 10% alkylated and 90% catalytically cracked stocks.
Fuel C is a laboratory prepared blend containing: 34% of saturated hydrocarbons (made up of 19% paraffins and 15% naphthenes), 30% unsaturated, and 36% aromatic hydrocarbons.
Copolymer A contains, in combined form, 50 parts of octadecenyl methacrylate by weight, 40 of styrene and 10 of beta-diethylaminoethyl methacrylate.
Copolymer C contains 90 of lauryl methacrylate and 10 of beta-diethylaminoethyl methacrylate.
Copolymer D contains 80 of vinyl lauryl ether and 20 of vinyl beta-diethylaminoethyl ether.
Copolymer E contains 92.5 of vinyl laurate and 7.5 of beta-diethylaminoethyl methacrylate.
Copolymer F contains 90 of mixed cetyl and stearyl methacrylate and 10 of 4-vinyl pyridine.

The lauryl alcohol used in making the above lauryl esters and ethers was of technical grade, made by reducing coconut oil fatty acids and containing minor amounts of the immediate higher and lower members of the series with even numbers of carbon atoms.

*Table II*

EFFECT OF SUNLIGHT—COMPARISON OF CONCENTRATIONS—EXPOSURE PRODUCING FIRST NOTICEABLE HAZE

|  | Control, hrs. | Copolymer A | | |
|---|---|---|---|---|
|  |  | 10 lbs. per 1,000 bbl. 0.0038% | 5 lbs. per 1,000 bbl. 0.0019% | 2.5 lbs. per 1,000 bbl. 0.00095% |
| Fuel A +3 ml. TEL per gal | 3–4 | 31 | 28 | 6 |
| Fuel B +3 ml. TEL per gal | 3–4 | 48 | 51 | 7 |
| Fuel C +3 ml. TEL per gal | 3–4 | 48 | 27 | 8 |

*Table III*

EFFECT OF STORAGE AT 110° F. (IN THE DARK)—STORAGE PERIODS IN DAYS REQUIRED FOR PRODUCTION OF THE FIRST NOTICEABLE HAZE

|  | Control, days | Copolymer A—10 lbs. per 1,000 bbl. 0.0038% | Control, days | Copolymer A—5 lbs. per 1,000 bbl. 0.0019% | Control, days | Copolymer A—10 lbs. per 1,000 bbl. 0.00038% |
|---|---|---|---|---|---|---|
| Fuel A+3 ml.+4.6 ml. TEL per gal | 38 | 125 | 36 | 45 | 34 | 66 |
|  | 34 | 75 | 37 | 45 | 28 | 43 |
| Fuel B+3 ml.+4.6 ml. TEL per gal | 72 | 155 | 57 | 91 |  |  |
|  | 65 | 132 | 32 | 83 | 35 | 66 |
| Fuel C+3 ml.+4.6 ml. TEL per gal | 54 | 132 | 32 | 65 |  |  |
|  | 54 | 74 | 35 | 62 |  |  |

Results obtained when the fuel contains 4.6 ml. of TEL per gallon, as in aviation fuels, are, in general, very similar to those results obtained with 3 ml. of TEL when using the same concentrations of basic amino copolymers as shown in Table III. Certain fuels, however, are exceptionally sensitive to high TEL concentrations when exposed to light; of significance is the fact that the addition of the basic amino copolymers of the present invention to these sensitive systems very materially increase the stability of said systems. Thus fuel B with 4.6 ml. of TEL per gallon showed the first haze in the sunlight test in less than one hour; in contrast thereto, by adding copolymer A in the proportion of 10 lbs. of copolymer per 1,000 barrels of fuel, the appearance of the first haze was postponed 7 hours. The stabilization of gasolines containing substantially less than 3 ml. of TEL per gallon, on the other hand, is, in general, much easier and lower concentrations of the basic amino copolymers are required to give the stabilizing effects described in the above tables for fuels containing 3 ml. of TEL.

It will be seen from these tables that very small proportions of the basic copolymers are effective in postponing the appearance, even the first sign, a slight haziness, of the formation of solid, lead-containing material. The formation of enough material to be actually troublesome is of course postponed to a much greater extent. Since the tests used are highly accelerated, it will be clear that the present invention gives protection against the formation of deposits arising in leaded gasoline for all reasonable storage conditions.

I claim:

1. Gasoline containing an antiknock quantity of tetraethyllead and from about 0.0003 to about 0.01% by weight of a copolymer of octadecenyl methacrylate, styrene and beta-diethylaminoethyl methacrylate, said copolymer having an inherent viscosity of 0.1 to 3.0 as determined at 0.1% weight/volume concentration in benzene at 25° C.

2. The gasoline of claim 1 containing from about 0.5 to about 4.6 ml. of tetraethyllead per gallon of gasoline.

3. The gasoline of claim 1 containing from 0.01 to about 0.001% by weight of said copolymer as haze and precipitation inhibiting agent.

4. Gasoline containing an antiknock quantity of tetraethyllead and from about 0.0003 to about 0.01% by weight of a copolymer of 50 parts octadecenyl methacrylate, 40 parts styrene and 10 parts beta-diethylaminoethyl methacrylate, said copolymer having an inherent viscosity of 0.1 to 3.0 as determined at 0.1% weight/volume concentration in benzene at 25° C.

5. The gasoline of claim 4 containing from about 0.5 to about 4.6 ml. of tetraethyllead per gallon of gasoline.

6. The gasoline of claim 4 containing from 0.01 to about 0.001% by weight of said copolymer as haze and precipitation inhibiting agent.

References Cited in the file of this patent
UNITED STATES PATENTS

| 2,469,737 | McNab et al. | May 10, 1949 |
| 2,737,452 | Catlin et al. | Mar. 6, 1956 |